United States Patent [19]
Judd

[11] 3,853,145
[45] Dec. 10, 1974

[54] PRESSURE CHANGE ACTUATED SEQUENCING VALVE

[75] Inventor: Everett W. Judd, Ogden, Utah

[73] Assignees: Daniel F. Hammon, Kentfield; Olson LaClead, Unita, both of Calif., a part interest to each

[22] Filed: Aug. 7, 1973

[21] Appl. No.: 386,467

[52] U.S. Cl............... 137/624.18, 251/230, 251/54, 239/66
[51] Int. Cl............................................. A01g 25/02
[58] Field of Search..... 137/624.11, 624.12, 624.13, 137/624.15, 624.18, 624.2, 624.27; 251/230, 54, 55; 239/66

[56] References Cited
UNITED STATES PATENTS

| | | | |
|---|---|---|---|
| 2,579,334 | 12/1951 | Plank | 251/54 |
| 3,183,933 | 5/1965 | Whitlock | 137/624.18 |
| 3,411,532 | 11/1968 | Sully | 137/624.11 X |
| 3,519,016 | 7/1970 | Kah | 239/66 X |

Primary Examiner—Alan Cohan
Attorney, Agent, or Firm—Townsend and Townsend

[57] ABSTRACT

A pressure change actuated sequencing valve comprising a valve and valve seat; a pressure sensitive spring biased diaphragm assembly coupled to the valve; and a valve sequencing assembly coupled to the diaphragm. The valve sequencing assembly has a rotatable sequencing wheel with a number of circumferentially arranged sawteeth and radially extending escapement slots, the escapement slots being engageable with only the lower cam lobe, and a reciprocable cam shaft with differently dimensioned upper and lower facing cams. Reciprocation of the cam shaft in response to large pressure changes causes rotational escapement of the sequencing wheel. When the lower cam lobe enters an escapement slot, the valve is actuated by the lost motion coupling device. The spacing of the escapement slots determines the rate of valve actuation. The diaphragm assembly includes a damping fluid and a flow orifice plate to prevent operation of the sequencing assembly in response to spurious pressure fluctuations. The flow orifice plate includes a number of pairs of differently sized flow orifices and one-way flap valves for providing different actuation rates of the valve assembly in opposite directions. A flow adjusting means, a manual sequencing means and a sequence monitoring means are all provided which may be simply installed and removed while the valve is in situ.

9 Claims, 13 Drawing Figures

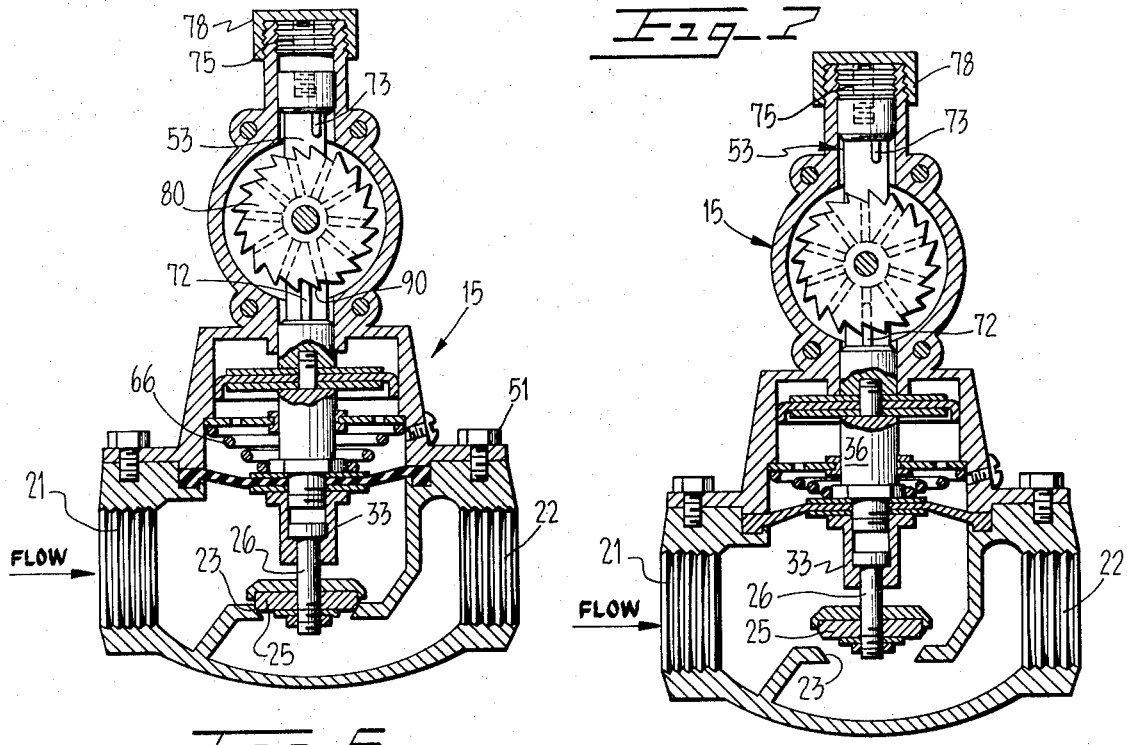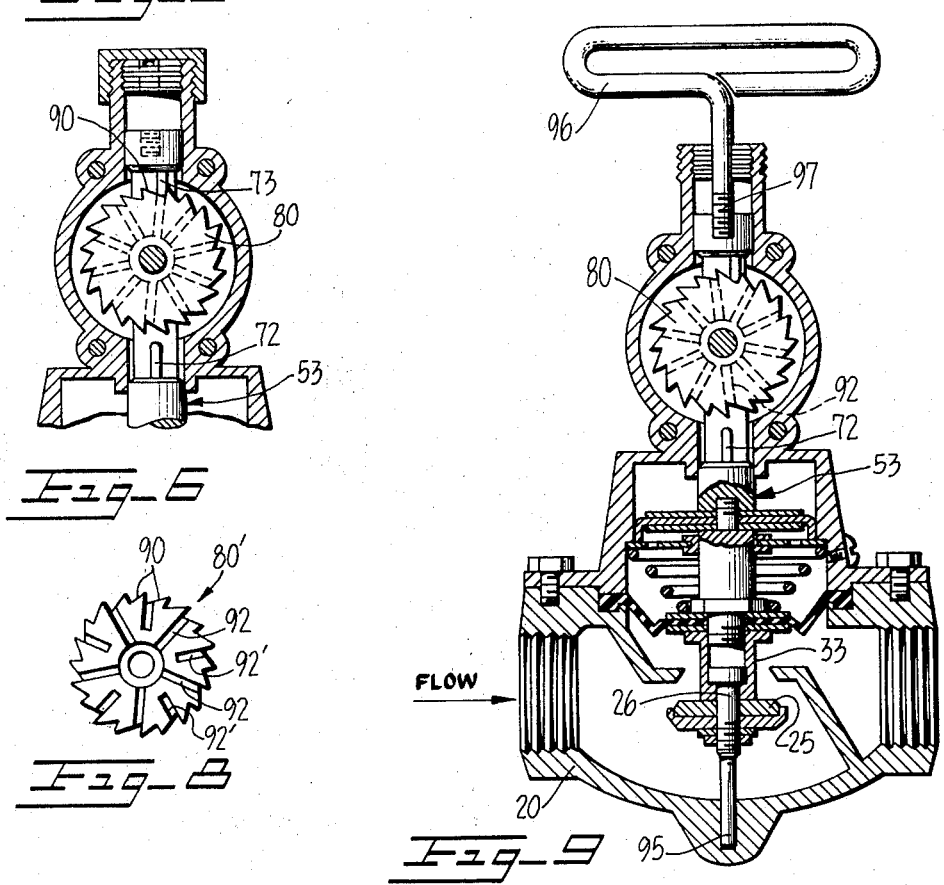

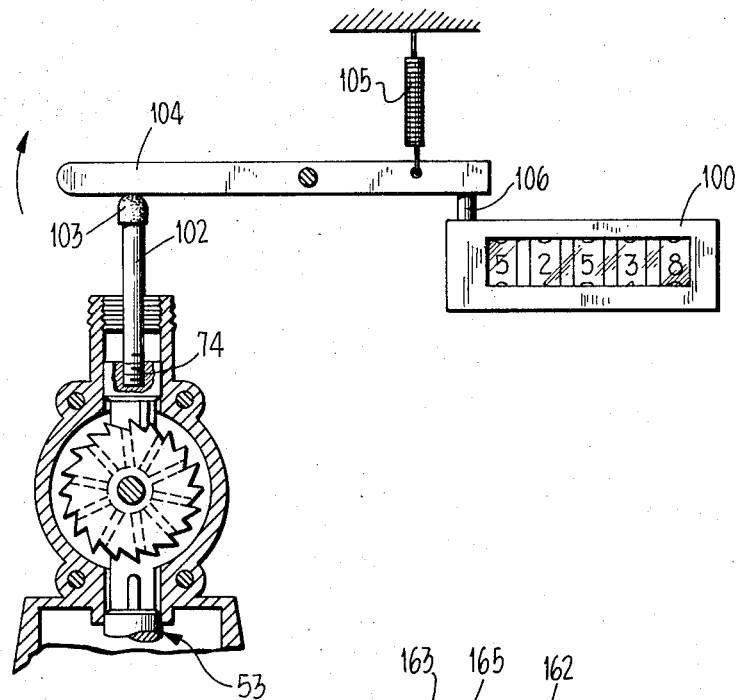
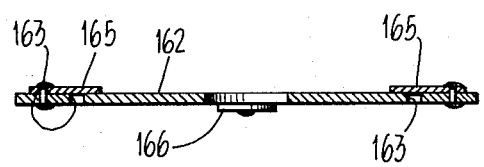
Fig_10
Fig_12
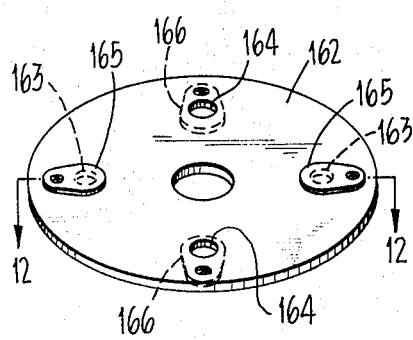
Fig_11
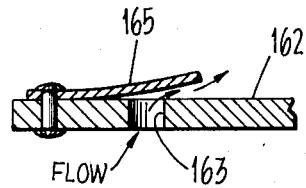
Fig_13

PRESSURE CHANGE ACTUATED SEQUENCING VALVE

BACKGROUND OF THE INVENTION

1. Field of the Invention

This invention relates to sequencing valves for controlling the distribution of fluids flowing in one or more conduits. More particularly, this invention relates to sequencing valves which operate in response to fluid pressure variations to effect such distribution control.

Sequencing valves are known which are employed in conjunction with a main supply conduit and a number of fluid distribution lines for automatically controlling the distribution of fluids flowing from the main conduit among the various lines.

In a typical fluid distribution system using sequencing valves, the valves are each deployed at the upstream end of the associated distribution lines in such a manner as to be individually interposed between the main supply conduit and the associated distribution line. By selectively opening and closing the individual valves, the distribution of the fluid from the main supply conduit to the individual distribution lines may be controlled in accordance with a predetermined scheme.

Systems employing sequencing valves have found wide use in various fluid flow distribution systems. Illustrative of such applications are irrigation systems, processing plants, sewage systems, petroleum fluid product pipeline distribution systems, petroleum refineries, and the like.

Some known sequencing valves incorporate an actuating mechanism which is responsive to an electrical control signal generated by a master control unit, either automatically or manually, to control the flow of fluid in the associated pipe. In systems using this type of sequencing valve, an electrical control signal is generated by the master control unit whenever the fluid flow distribution is to be altered. While such electrically operable systems are suitable for many uses, in many applications the attendant complexity of the master control unit and the necessity of providing electrically conductive cables to the individual valve sites results in a system which is extremely expensive to install and maintain and which is relatively prone to equipment failure.

Other systems are known, for example, that disclosed in U.S. Pat. No. 3,241,569 to Sully et al., in which the individual sequencing valves are operable in response to a change of a predetermined magnitude in the pressure of the fluid flowing in the main supply conduit. Sequencing valves of this type enjoy the advantage that no electrical signal carrying conductors need be installed between the master control unit and the individual valve sites. Also, since the sequencing valves incorporate the necessary sequencing logic required for proper operation of the system, the master control unit need not incorporate a complex and expensive design. Known systems of this type, however, have been found to be sensitive to spurious fluid pressure fluctuations and thus unreliable in operation. In addition, many valves of this type incorporate mechanisms which are easily fouled by foreign material present in the fluid flowing of the system. Accordingly, sequencing valves of this type have not heretofore enjoyed wide success.

SUMMARY OF THE INVENTION

The invention comprises a pressure change actuated sequencing valve which is extremely simple in design and construction, reliable in operation and manually adjustable as installed. In the preferred embodiment, a valve is installed in a lower housing in operable relation with a stationary valve seat. The valve stem is coupled by means of a lost motion coupling device to a spring biased disphragm assembly. The diaphragm assembly in turn is coupled to a valve sequencing assembly. The diaphragm assembly is responsive to fluid pressure fluctuations of at least a predetermined threshold to impart reciprocating motion to the valve sequencing assembly.

The valve sequencing assembly comprises a reciprocable cam shaft received in a bore in an upper housing and coupled at the lower end thereof to the diaphragm assembly, and a sequencing wheel. The sequencing wheel is rotatably mounted in the upper housing in operative association to upper and lower facing cam lobes of the cam shaft. The sequencing wheel has a plurality of circumferentially arranged sawteeth and a plurality of radially extending escapement slots engageable with only the lower cam lobe and spaced peripherally of the wheel in a predetermined pattern. The sawteeth are so dimensioned that, as the cam shaft reciprocates in response to fluid pressure fluctuations of a predetermined magnitude, the axial free play provided by the lost motion mechanism is not exceeded when the lower cam lobe is positioned in the nadir of any of the sawteeth. However, when the lower cam lobe enters one of the escapement slots, the axial free play of the lost motion coupling device is exceeded and the valve is actuated.

The diaphragm assembly is provided with a damping fluid and an orifice plate to prevent spurious pressure fluid fluctuations from operating the sequencing mechanism. In an alternate embodiment, the orifice plate is provided with two sets of flow restricting orifices of different diameters and flap valves for providing different actuation rates of the valve assembly in opposite directions.

The preferred embodiments are arranged and constructed to enable adjustment or removal of the various valve components without uncoupling the main housing from the associated fluid conduit.

A flow adjusting device is coupled to the upper end of the cam shaft for permitting variable manual adjustment of the flow rate through the valve assembly. Means are also provided for enabling manual sequencing of the sequencing wheel which affords on site adjustment of the valve sequencing without removing the sequencing assembly. In addition, means are provided for monitoring the performance of the sequencing assembly.

For a further understanding of the nature and advantages of the invention, reference should be had to the following detailed description taken in conjunction with the accompanying drawings.

BRIEF DESCRIPTION OF THE DRAWINGS

FIG. 5 is a sectional view similar to FIG. 2 showing the first embodiment in an alternate closed position;

FIG. 6 is a detailed sectional view showing the sequencing components in an intermediate position;

FIG. 7 is a sectional view similar to FIG. 5 showing the first embodiment in the open position;

FIG. 8 is an elevation rear view of an alternate sequencing wheel;

FIG. 9 is a sectional view of an alternate embodiment of the invention;

FIG. 10 is a detail sectional view of the upper end of the valve assembly illustrating a monitoring device;

FIG. 11 is a perspective view of an alternate diaphragm plate having variable flow restricting orifices;

FIG. 12 is a sectional view taken along lines 12—12 of FIG. 11; and

FIG. 13 is an enlarged partial sectional view similar to FIG. 12 showing operation of a flap valve.

DESCRIPTION OF THE PREFERRED EMBODIMENTS

Figure 1:
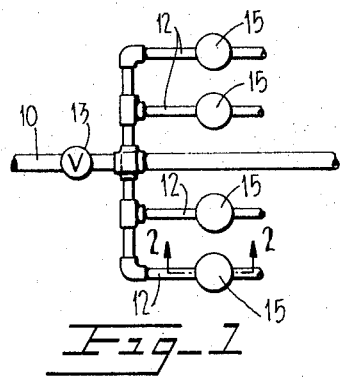
FIG. 1 is a plan view of a fluid distribution system utilizing the invention.

Turning now to the drawings, FIG. 1 shows a fluid distribution system in which a main conduit 10 provides a fluid flow path for a suitable fluid to be distributed among a plurality of lateral conduits 12, the flow direction being from left to right in the figure. Located in main conduit 10 is a master control valve 13 for controlling the flow of fluid from a suitable source (not shown) to lateral conduits 12. Although depicted as located adjacent the lateral conduits 12, it is understood that master control valve 13 may be installed at a site remote therefrom if desired. Located in each of lateral conduits 12 is a sequencing valve 15 which controls the flow of fluid through the associated lateral conduit. Each sequencing valve 15 is responsive to a predetermined number of fluid pressure changes of a predetermined magnitude produced by closing and opening master control valve 13 in the manner described below. Sequencing valves 15 may be arranged to permit the flow of fluid through only individual ones of lateral conduits in a sequential manner so that fluid is conducted through only one lateral conduit at any given time. Alternatively, sequencing valves 15 may be arranged to permit the flow of fluid through designated pairs or triples of lateral conduits 12 as desired. In addition, further groups of lateral conduits 12 may be coupled to main conduit 10 at other sites (not shown).

Figure 2:
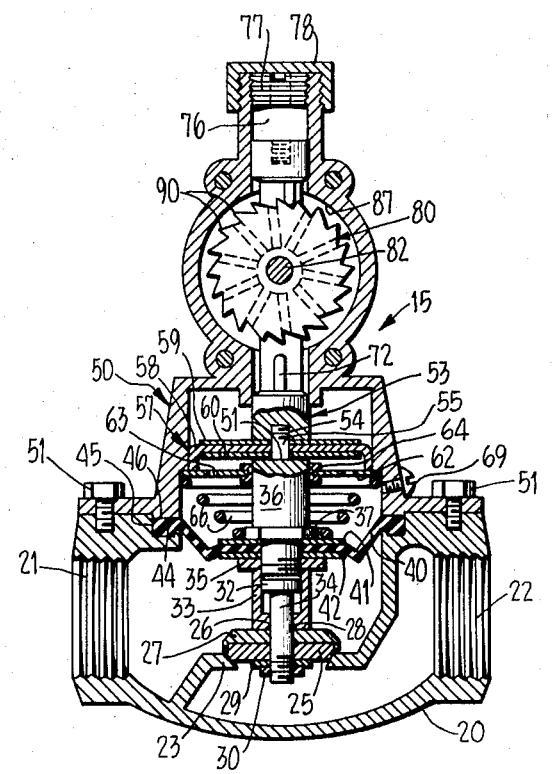
FIG. 2 is a sectional view taken along lines II — II of a first embodiment of the invention.

FIG. 2 shows an enlarged sectional view of a first embodiment of sequencing valve 15, the valve being shown in the relaxed position with no pressure in main conduit 10. A lower housing member 20 has an inlet 21, an outlet 22 and a valve seat 23 for cooperating with a normally closed valve disk 25.

Valve disk 25 is secured to the lower end of a spindle 26 between a backing disk 27 held against a shoulder 28 on spindle 26 and a washer 29 and internally threaded nut 30 engaged with the threaded lower end of spindle 26. Spindle 26 has an enlarged head 32 received in an enlarged bore in a coupling member 33, and a central portion 34 of smaller diameter slideably received in an open bore in the lower portion of coupling member 33. The upper portion of the bore in coupling member 33 is threadably engaged to a lower threaded portion of an intermediate coupling member 36 having an enlarged bearing section 37.

Sandwiched between bearing section 37 and a flange 35 of coupling member 33 are a flexible diaphragm 40 and a pair of flanking spacer plates 41, 42. Diaphragm 40, which has a dished or convoluted configuration with the convolution preferably being much less than 180°, has an enlarged rim 44 received in a channel 45 formed in the upper surface of lower housing member 20. Rim 44 is secured from above by a boss 46 projecting from the lower surface of an upper housing member 50. Upper housing member 50 is secured to lower housing member 20 by means of cap screws 51 so that rim 44, channel 45 and boss 46 provide fluid isolation between the lower and upper surfaces of diaphragm 40.

A piston cup assembly 47 comprising a cup seal 58 and a pair of flanking spacer plates 59, 60 is sandwiched between an enlarged upper bearing surface 51 of intermediate coupling element 36 and the lower end of a cam shaft 53. Cam shaft 53 has a threaded bore 54 for receiving a narrowed threaded end 55 of intermediate coupling element 36.

Mounted immediately below piston cup assembly 57 is a damping plate 62 having a plurality of flow orifices 63 and a central bushing 64 in which the outer periphery of intermediate coupling member 36 is slidably received. A diaphragm spring 66 disposed about intermediate coupling member 36 bears against the lower surface of damping plate 62 and the upper surface of spacer plate 41 to provide a biasing force tending to urge the assembly in the downward direction as viewed in FIG. 2 to seal valve disk 25 against valve seat 23.

A suitable damping fluid is provided in the volume enclosed by diaphragm 40 and piston cup assembly 57 by injecting the fluid through a fill port 68 and inserting a threaded closure plug 69. The motion damping provided by plate 62 and the damping fluid prevents actuation of valve 15 by spurious pressure changes in main conduit 10. The nature of the damping fluid is dependent upon the requirements of a particular application and may best be determined empirically. Conventional hydraulic fluid and commercially available silicone damping fluids have been found to provide excellent results in many applications.

Figure 3:
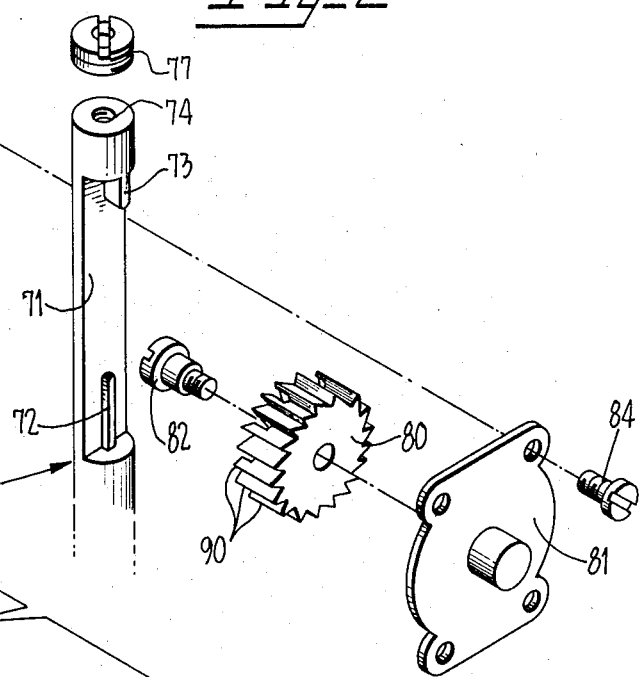
FIG. 3 is an exploded perspective view showing the sequencing components of the preferred embodimemt.

As best shown in FIG. 3, cam shaft 53 has a central flatted portion 71 extending longitudinally thereof and lower and upper cam lobes 72, 73 also extending longitudinally thereof. The radial dimension or height of upper cam lobe 73 above the flatted surface 71 is greater than that of lower cam lobe 55 for a purpose to be described. The upper cylindrical portion of cam shaft 53 is provided with a tapped bore 74 for receiving the threaded end of several attachments described below.

Cam shaft 53 is slideably received in a bore 76 centrally located within the upper housing 50. The upper portion of bore 76 is threaded to receive an externally threaded flow adjusting screw 77 having an axial bore. Cam shaft 53 is arranged in bore 76 in cooperative relation with a sequencing wheel 80. A threaded closure cap 78 provides a cover for the upper end of bore 76.

Sequencing wheel 80 is rotatably mounted on a cover plate 81 by means of a pinion bolt 82. Mounting plate 81 is secured to upper housing 50 by means of screws 84 received in threaded bore 85 with sequencing wheel 80 received in a chamber 87 formed in housing 50 in a direction generally transverse to the axis of bore 76.

Figure 4:
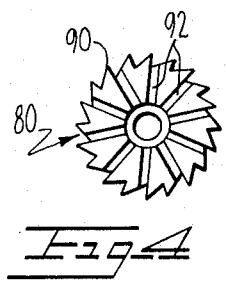
FIG. 4 is an elevational rear view of the sequencing wheel.

As best shown in FIGS. 2–4, sequencing wheel 80 has a plurality of substantially identical sawteeth 90 arranged circumferentially thereof, and a plurality of radially extending escapement channels 92 arranged circumferentially and opening into the rear face of wheel 80. The radial extent of escapement channels 92 is selected to permit lower cam lobe 72 to be received therein when the sequencing valve components are operatively assembled but to prevent upper cam lobe 73 from entering escapement channels 92. In addition, in an assembled device the camming faces of lower cam lobe 72 and upper cam lobe 73 are both arranged to permit alternate contact with the surfaces of teeth 90 to impart rotary escapement motion to sequencing wheel 80. As discussed below, the number and radial spacing of escapement channels 92 determines the number of pressure fluctuations required to actuate the sequencing valve.

In operation, with no fluid pressure applied as shown in FIG. 2, diaphragm spring 66 maintains valve disk 25 seated on valve seat 23. FIG. 5 shows the response of sequencing valve 15 to an increase in pressure at inlet 21. As shown in this Fig., increased pressure on the bottom surface of diaphragm 40 results in upward movement of intermediate coupling member 36 and cam shaft 53. As the camming face of lower cam lobe 72 contacts the outer surface of a proximate sawtooth 90, sequencing wheel 80 is rotated counter-clockwise until the edge of the tooth 90 contacts the edge of lower cam lobe 72. The upward travel of cam shaft 53 is limited by the nadir of tooth 90, in contact with the camming face of lower cam lobe 72 to prevent the axial free motion permitted by the lost motion coupling elements 26,33 from being exceeded. Thus, valve disk 25 remains seated on valve seat 23.

FIG. 6 shows the configuration of the valve sequencing assembly after a subsequent drop in fluid pressure at inlet 21. As shown in this Fig., cam shaft 53 has been reciprocated by the action of diaphragm spring 66 to the lowermost position. During downward motion of cam shaft 53, the camming face of upper cam lobe 73 contacts the outer surface of a proximate tooth 90 causing sequencing wheel 80 to rotate counter-clockwise until the edge of the sawtooth 90 contacts the edge of upper cam lobe 73. The downward travel of cam shaft 53 is limited by the nadir of tooth 90 in contact with the camming face of upper cam lobe 73.

FIG. 7 illustrates the configuration of the sequencing valve in response to the application of a second increase in pressure at inlet 21. In this Fig., lower cam lobe 72 has been received in escapement channel 92, thereby permitting additional upward travel of cam shaft 53, intermediate coupling element 36, lost motion coupling 33 and valve disk 25. The additional upward travel distance provided by escapement channel 92 is sufficient to enable valve disk 25 to be unseated from valve seat 23, thereby permitting fluid to flow through valve outlet 22 to the associated lateral conduit 12.

As noted above, the number and radial spacing of escapement channels 92 in sequencing wheel 80 determines the number of pressure cycles required to cyclically actuate the sequencing valve. The illustrated sequencing wheel 80 is provided with one escapement channel 92 for each two sawteeth 90. Thus, in the illustrated embodiment, the sequencing valve is actuated every second pressure cycle, where one pressure cycle comprises a drop in main conduit pressure followed by a rise in main conduit pressure. Other arrangements may be employed, if desired. For example, to sequentially actuate the valves 15 in lateral conduits 12 of FIG. 1 on a mutually exclusive basis, sequencing wheels 80 having an escapement channel 92 for every fourth sawtooth 90 are employed. Thus, it is understood that the number and spacing of the escapement channels 92 is dependent upon the particular sequencing program envisioned for a given application.

As shown in FIG. 7, when lower cam lobe 72 is engaged in escapement channel 92, the upward travel of cam shaft 53 is limited by the bottom face of flow adjusting screw 78. Flow adjusting screw 78 may be adjusted manually to provide a predetermined fluid flow rate through the valve. Thus, when installing several sequencing valves 15 in a plurality of lateral conduits, the flow of fluid through the system may be easily balanced by adjusting the individual screws 78. In addition, screws 78 may be adjusted to provide a throttling action for some or all of the valves 15, if desired.

Throttling action may also be accomplished in the following manner. With reference to FIG. 8, a sequencing wheel 80' is shown which is provided with peripheral sawteeth 90 and a plurality of radially extending escapement channels 92, 92' arranged circumferentially and opening into the rear face of wheel 80'. Escapement channels 92 are substantially identical to escapement channels 92 of sequencing wheel 80 shown in FIG. 4 and have a radial dimension sufficiently great to permit lower cam lobe 72 of cam shaft 53 to travel upwardly the distance required to fully open the valve. Throttling escapement channels 92', on the other hand, have a shorter radial dimension which is sufficiently great to permit cam shaft 53 to travel upwardly a shorter distance to unseat valve disk 25 without fully opening the valve. Thus, by limiting the upward axial travel of cam shaft 53, escapement channels 92' enable valve 15 to operate in a throttling mode. As depicted in FIG. 8, escapement channels 92' are alternately arranged about the periphery of sequencing wheel 80' with escapement channels 92. Thus, sequencing wheel 80' provides throttling action for every other actuation cycle of the valve. If desired, other arrangements may be employed to provide throttling action for every third, fourth, etc., actuation cycle of the valve.

FIG. 9 illustrates a second embodiment of the invention in which valve disk 25 is normally open. In this embodiment the lost motion coupling mechanism 26, 33 permits reciprocating motion of cam shaft 53 without closing the valve until lower cam lobe 72 is engaged by an escapement slot 92. In addition, in the FIG. 8 embodiment, the lower portion of spindle 26 is extended and received in a guide bore 95 formed in the bottom of lower housing member 20. This arrangement further improves the lateral stability of the assembly and may be employed in either embodiment.

Also illustrated in FIG. 9 is a manual operating rod 96 having a threaded end 97 received in threaded bore 74 of cam shaft 53 for permitting manual reciprocation of cam shaft 53 and thus manual setting of sequencing wheel 80 to a predetermined starting position. This arrangement provides a convenient means for initially presetting the various valves 15 to a desired initial sequencing configuration. After presetting of the individual valves 15, manual sequencing rod 96 may be removed by unscrewing the threaded end 97 from threaded bore 74 of cam shaft 53 after which closure cap 78 may be installed. If desired, closure cap 78 may be provided with a circular aperture sized to accomodate the lower end of rod 96 to facilitate installation and removal.

It is frequently desirable to utilize the sequencing action of a valve 15 to provide a counting or control function. FIG. 10 illustrates an arrangement for utilizing the reciprocating motion of cam shaft 53 to drive a counter 100. A threaded shaft 102 is shown engaged in threaded bore 74 in cam shaft 53. The upper end of shaft 102 is provided with a camming tip 103, such as a rubber tip, which contacts a pivoted arm 104. Arm 104 is biased in the counter-clockwise direction by means of a biasing spring 105 attached to a convenient fixed reference. The distal end of arm 104 contacts an actuating member 106 of a conventional counter 100. In operation, as cam shaft 53 travels upwardly, arm 104 is rotated clockwise by camming tip 103 causing actuating member 106 to increment counter 100. As cam shaft 53 subsequently travels in the downward direction, arm 104 follows camming tip 103 under the influence of biasing spring 105. If desired, closure cap 78 may be provided with a circular aperture sized to accomodate shaft 102 to enable shaft 102 to be installed without removing cap 78.

In some applications, it is desirable to control the actuation of diaphragm 40 at different rates in opposite directions. FIGS. 11–13 illustrate a preferred arrangement for accomplishing this function. An orifice plate 162 is provided with two sets of flow orifices 163, 164 to different dimensions. Each flow orifice 163 is provided with a flap valve 165 permitting one-way flow of fluid therethrough in the upward direction only as illustrated in FIG. 13. Flow orifices 164, on the other hand, are each provided with flap valves 166 shown in phantom in FIG. 11 which permit fluid flow in the downward direction only. In the embodiment illustrated in FIGS. 11–13, upward flow orifices 163 have a smaller dimension than downward flow orifices 164 in order to shorten the cycle time of a FIG. 2 type valve from the pressure to the no-pressure condition. If a contrary operation is desired, the position of orifice plate 162 is merely inverted. Also, additional orifices of either variety may be added, if desired, to flow orifice plate 162, along with the required flap valves.

As will now be apparent, the invention described above provides a fluid pressure actuated sequencing valve assembly which is simple in construction, easily installed, and readily replaced. In this connection, it is noted that the entire valve assembly may be removed from lower housing 20 by removing cap screws 51 and lifting out upper housing 50 with the components intact. It is further noted that sequencing wheel 80 may be removed for inspection or replacement, if desired, by merely removing cover plate 81. Similarly, cam shaft 53 may be readily replaced by first removing sequencing wheel 80 and closure cap 78 and unscrewing cam shaft 53 from threaded projection 54 of intermediate coupling member 36.

As will be readily apparent, the components of the valve assembly 15 lying above diaphragm 40 are completely isolated from the fluid flowing through the valve from inlet 21 to outlet 22 and thus cannot be contaminated by foreign matter which may be present in the fluid. Further, because of the substantial bearing surface provided by the junctions between cam shaft 53 and bore 76 and the junctions between the enlarged head portion 32 of spindle 26 and the large inner bore of coupling element 33, and the junction between the portion 34 of reduced diameter of spindle 33 and the open bore of coupling element 33, the entire structure exhibits a remarkable degree of lateral stability.

While the foregoing provides a full disclosure of the preferred embodiments of the invention, it is understood that various modifications, alternate constructions and equivalents may be employed without departing from the true spirit and scope of the invention. For example, the lost motion coupling mechanism 26, 33 of the FIG. 8 normally open valve embodiment may be replaced by a solid coupling, if deemed desirable in a particular application. Also, the reciprocating motion of cam shaft 53 and shaft 102 may be utilized to operate other devices than counter 100. Therefore, the above description and illustrations should not be construed as limiting the scope of the invention which is defined by the appended claims.

What is claimed is:

1. A pressure responsive sequencing valve assembly comprising:

a body member having an inlet, an outlet, a valve seat between said inlet and said outlet, and first and second chambers having a first bore therebetween, said second chamber opening into a second bore generally opposite said first bore;

a valve member for controlling fluid flow through said valve seat, said valve member having a valve disk and a stem with an enlarged head portion; and damped sequencing means for controlling the actuation of said valve member in response to inlet pressure cycles, said damped sequencing means including:

a flexible, non-rolling diaphragm mounted in said body member in substantially unrestricted fluid communication with said inlet, said diaphragm providing a fluid seal for the end of said first chamber remote from said bore, a piston cup assembly mounted in said first chamber in movable sealing engagement with the walls thereof to define with said diaphragm a sealed enclosure adapted to contain a damping fluid, a substantially rigid damping plate mounted in said first chamber between said diaphragm and said piston cup assembly, said plate having a central aperture and at least one flow control orifice for controlling the rate of flow of said damping fluid therethrough to prevent operation of said damped sequencing means in response to spurious inlet pressure variations, spring means coupled between said damping plate and said diaphragm for urging said diaphragm to a normal configuration, motion translating means coupled to said diaphragm for reciprocal motion therewith and coupled to said valve member, said motion translating means including a first coupling member comprising a body having a hollow interior for slidably receiving the enlarged head portion of said valve stem and a first end wall provided with a bore for slidably receiving said valve stem, said hollow interior and said bore being dimensioned to snugly accommodate the associated valve member portions to provide a lost motion coupling with first major bearing surfaces enabling reciprocation of said motion translating means by a predetermined amount without actuating said valve member, said motion translating means further including an intermediate coupling member secured at a first end to the other end of said first coupling member body with a central portion of said diaphragm sandwiched therebetween, a central body portion slidably received in said central aperture of said damping plate to provide second major bearing surfaces, and a second end, said motion translating means further including a cam shaft having a first end secured to said second end of said intermediate coupling member with the central portion of said piston cup assembly sandwiched therebetween, a lower portion slidably received in said first bore to provide third major bearing surfaces, an upper portion slidably received in said second bore to provide fourth major bearing surfaces, and an intermediate portion having a pair of raised facing cam members extending therealong in a direction substantially parallel to the axis of said shaft, one of said facing cam members having a greater dimension in a direction substantially normal to said shaft axis then the other one of said facing cam members; and valve cycle means for controlling the rate of actuation of said valve member, said valve cycle means including a rachet wheel mounted in said second chamber for rotation about an axis substantially normal to said cam shaft axis, said wheel having a plurality of peripheral teeth adapted to be alternately engaged by said cam members upon reciprocation thereof by said diaphragm to rotate said wheel by incremental amounts, said teeth having means for limiting reciprocation of said cam shaft to said predetermined amount to prevent premature actuation of said valve means, and a plurality of escapement channels formed in a face of said wheel engageable only with said other one of said cam members for permitting said reciprocation to exceed said predetermined amount after a predetermined number of said inlet pressure cycles to actuate said valve member, said major bearing surfaces limiting movement of said motion translating means and said valve member to substantially only axial movement.

2. The combination of claim 1 wherein said escapement channels are radially arranged at angularly spaced intervals about the axis of said wheel.

3. The combination of claim 1 wherein predetermined ones of said escapement channels are dimensioned to permit limited actuation of said valve member when said one of said cam members is engaged therein in order to provide throttling action of said fluid flow.

4. The combination of claim 1 further including adjustable flow regulating means for limiting said reciprocation by a second predetermined amount to provide regulated fluid flow through said valve when said valve member is actuated, said flow regulating means comprising a threaded member positioned in said body member adjacent said second end of said cam shaft and providing an abutment face engageable therewith when said cam shaft has reached the upper limit of said second predetermined amount of reciprocation.

5. The combination of claim 1 further including actuatable means coupled to said cam shaft for setting said valve cycle means to an initial position.

6. The combination of claim 1 wherein said damping plate is provided with a plurality of flow orifices, at least one of said flow orifices having a different flow diameter than the remaining ones of said flow orifices, and a plurality of valving members operatively associated to different ones of said flow orifices, the valving members associated to said at least one of said flow orifices providing damping fluid flow therethrough in a first working direction, the valving members associated to said remaining ones of said flow orifices providing damping fluid flow therethrough in the opposite working direction.

7. The combination of claim 6 wherein said valving members comprise a flap valve mounted on the downstream side of said plate.

8. The combination of claim 6 wherein said plurality of flow orifices and valving members are divided into two groups, each group providing damping fluid flow in a different working direction.

9. The combination of claim 1, wherein said first chamber is provided with an access bore and a removable closure plug fitted therein for enabling withdrawal and replenishment of said damping fluid.

* * * * *